(12) United States Patent
Gasda et al.

(10) Patent No.: US 10,615,444 B2
(45) Date of Patent: *Apr. 7, 2020

(54) ANODE WITH HIGH REDOX STABILITY

(71) Applicant: BLOOM ENERGY CORPORATION, Sunnyvale, CA (US)

(72) Inventors: Michael Gasda, Mountain View, CA (US); Chockkalingam Karuppaiah, Cupertino, CA (US); Tad Armstrong, Burlingame, CA (US); Vijay Radhakrishnan, Mumbai (IN); Emad El Batawi, Sunnyvale, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 164 days.

This patent is subject to a terminal disclaimer.

(21) Appl. No.: 15/785,968

(22) Filed: Oct. 17, 2017

(65) Prior Publication Data

US 2018/0040909 A1    Feb. 8, 2018

Related U.S. Application Data

(60) Continuation-in-part of application No. 14/270,686, filed on May 6, 2014, now Pat. No. 9,812,714, which
(Continued)

(51) Int. Cl.
*H01M 8/2425* (2016.01)
*H01M 4/88* (2006.01)
(Continued)

(52) U.S. Cl.
CPC ......... *H01M 8/2425* (2013.01); *H01M 4/861* (2013.01); *H01M 4/8642* (2013.01);
(Continued)

(58) Field of Classification Search
CPC . H01M 2004/8684; H01M 2008/1293; H01M 4/861; H01M 4/8642;
(Continued)

(56) References Cited

U.S. PATENT DOCUMENTS 4,052,532 A    10/1977  Tannenberger
4,272,353 A     6/1981  Lawrance et al.
(Continued)

FOREIGN PATENT DOCUMENTS

CN    101147285 A    3/2008
CN    101295792 A    10/2008
(Continued)

OTHER PUBLICATIONS

Ahmad-Khantou et al., "Electrochemical & Microstructural Study of SOFC Cathodes Based on $La_{0.5}Sr_{0.3}MnO_3$ and $Pr_{0.65}Sr_{0.3}MnO_3$," Electrochemical Society Proceedings, 2001, p. 476-485, vol. 2001-16.

(Continued)

*Primary Examiner* — Adam A Arciero
(74) *Attorney, Agent, or Firm* — The Marbury Law Group PLLC

(57) ABSTRACT

A solid oxide fuel cell (SOFC) includes a cathode electrode, a solid oxide electrolyte and an anode electrode containing a first portion having a cermet containing a nonzero volume percent of a nickel containing phase and a nonzero volume percent of a ceramic phase and a second portion having a cermet containing a nonzero volume percent of a nickel containing phase and a nonzero volume percent of a ceramic phase, such that the first portion is located between the electrolyte and the second portion. The SOFC is an electrolyte-supported SOFC and the first portion of the anode electrode contains a lower ratio of the nickel containing phase to the ceramic phase than the second portion of the (Continued)

anode electrode. The first portion of the anode electrode has a porosity of 5-30 volume percent and the second portion of the anode electrode has a porosity of 31-60 volume percent.

6 Claims, 9 Drawing Sheets

Related U.S. Application Data is a division of application No. 11/907,204, filed on Oct. 10, 2007, now Pat. No. 8,748,056.

(60) Provisional application No. 60/852,396, filed on Oct. 18, 2006.

(51) Int. Cl.
| | | |
|---|---|---|
| *H01M 4/86* | (2006.01) | |
| *H01M 8/2457* | (2016.01) | |
| *H01M 4/90* | (2006.01) | |
| *H01M 8/1253* | (2016.01) | |
| *H01M 8/124* | (2016.01) | |

(52) U.S. Cl.
CPC ....... *H01M 4/8652* (2013.01); *H01M 4/8657* (2013.01); *H01M 4/8663* (2013.01); *H01M 4/8885* (2013.01); *H01M 4/9016* (2013.01); *H01M 4/9066* (2013.01); *H01M 8/2457* (2016.02); *H01M 8/1253* (2013.01); *H01M 2004/8684* (2013.01); *H01M 2008/1293* (2013.01); *Y02E 60/525* (2013.01); *Y02P 70/56* (2015.11)

(58) Field of Classification Search
CPC ............. H01M 4/8652; H01M 4/8657; H01M 4/8663; H01M 4/8885; H01M 4/9016; H01M 4/9066; H01M 8/1253; H01M 8/2425; H01M 8/2457; Y02E 60/525; Y02P 70/56
See application file for complete search history.

(56) References Cited

U.S. PATENT DOCUMENTS

| | | | |
|---|---|---|---|
| 4,426,269 A | 1/1984 | Brown et al. | |
| 4,459,340 A | 7/1984 | Mason | |
| 4,575,407 A | 3/1986 | Diller | |
| 4,686,158 A | 8/1987 | Nishi et al. | |
| 4,792,502 A | 12/1988 | Trocciola et al. | |
| 4,804,592 A | 2/1989 | Vanderborgh et al. | |
| 4,847,173 A | 7/1989 | Mitsunnaga et al. | |
| 4,898,792 A | 2/1990 | Singh et al. | |
| 4,913,982 A | 4/1990 | Kotchick et al. | |
| 4,917,971 A | 4/1990 | Farooque | |
| 4,925,745 A | 5/1990 | Remick et al. | |
| 4,983,471 A | 1/1991 | Reichner et al. | |
| 5,034,287 A | 7/1991 | Kunz | |
| 5,047,299 A | 9/1991 | Shockling | |
| 5,143,800 A | 9/1992 | George et al. | |
| 5,162,167 A | 11/1992 | Minh et al. | |
| 5,169,730 A | 12/1992 | Reichner et al. | |
| 5,170,124 A | 12/1992 | Blair et al. | |
| 5,171,645 A | 12/1992 | Khandkar | |
| 5,192,334 A | 3/1993 | Rohr et al. | |
| 5,213,910 A | 5/1993 | Yamada | |
| 5,215,946 A | 6/1993 | Minh | |
| 5,256,499 A | 10/1993 | Minh et al. | |
| 5,273,837 A * | 12/1993 | Aitken | H01M 8/0271 429/496 |
| 5,290,323 A | 3/1994 | Okuyama et al. | |
| 5,290,642 A | 3/1994 | Minh et al. | |
| 5,302,470 A | 4/1994 | Okada et al. | |
| 5,342,705 A | 8/1994 | Minh et al. | |
| 5,368,667 A | 11/1994 | Minh et al. | |
| 5,441,821 A | 8/1995 | Merritt et al. | |
| 5,498,487 A | 3/1996 | Ruka et al. | |
| 5,501,914 A | 3/1996 | Satake et al. | |
| 5,505,824 A | 4/1996 | McElroy | |
| 5,518,829 A | 5/1996 | Satake et al. | |
| 5,527,631 A | 6/1996 | Singh et al. | |
| 5,543,239 A | 8/1996 | Vlrkar et al. | |
| 5,573,867 A | 11/1996 | Zafred et al. | |
| 5,589,017 A | 12/1996 | Minh | |
| 5,589,285 A | 12/1996 | Cable et al. | |
| 5,601,937 A | 2/1997 | Isenberg | |
| 5,686,196 A | 11/1997 | Singh et al. | |
| 5,688,609 A | 11/1997 | Rostrup-Nielsen et al. | |
| 5,733,675 A | 3/1998 | Dederer et al. | |
| 5,741,406 A | 4/1998 | Barnett | |
| 5,741,605 A | 4/1998 | Gillett et al. | |
| 5,908,713 A * | 6/1999 | Ruka | H01M 4/9066 29/623.1 |
| 5,922,488 A | 7/1999 | Marucchi-Soos et al. | |
| 5,955,039 A | 9/1999 | Dowdy | |
| 5,993,989 A | 11/1999 | Baozhen | |
| 6,013,385 A | 1/2000 | DuBose | |
| 6,051,125 A | 4/2000 | Pham et al. | |
| 6,106,964 A | 8/2000 | Voss et al. | |
| 6,228,521 B1 | 5/2001 | Kim et al. | |
| 6,238,816 B1 | 5/2001 | Cable et al. | |
| 6,280,865 B1 | 8/2001 | Eisman et al. | |
| 6,287,716 B1 | 9/2001 | Hashimoto et al. | |
| 6,329,090 B1 | 12/2001 | McElroy et al. | |
| 6,361,892 B1 | 3/2002 | Ruhl et al. | |
| 6,403,245 B1 | 6/2002 | Hunt | |
| 6,436,562 B1 | 8/2002 | DuBose et al. | |
| 6,451,466 B1 | 9/2002 | Grasso et al. | |
| 6,489,050 B1 | 12/2002 | Ruhl et al. | |
| 6,495,279 B1 | 12/2002 | Bogicevic et al. | |
| 6,558,831 B1 | 5/2003 | Doshi et al. | |
| 6,582,845 B2 | 6/2003 | Helfinstine et al. | |
| 6,592,965 B1 | 7/2003 | Gordon | |
| 6,605,316 B1 | 8/2003 | Visco | |
| 6,623,880 B1 | 9/2003 | Geisbrecht et al. | |
| 6,632,554 B2 | 10/2003 | Doshi et al. | |
| 6,677,070 B2 | 1/2004 | Kearl | |
| 6,682,842 B1 | 1/2004 | Visco et al. | |
| 6,767,662 B2 | 7/2004 | Jacobson | |
| 6,787,261 B2 | 9/2004 | Ukai | |
| 6,803,141 B2 | 10/2004 | Pham | |
| 6,811,913 B2 | 11/2004 | Ruhl | |
| 6,821,663 B2 | 11/2004 | McElroy et al. | |
| 6,854,688 B2 | 2/2005 | McElroy et al. | |
| 6,924,053 B2 | 8/2005 | McElroy | |
| 6,972,161 B2 | 12/2005 | Beatty et al. | |
| 6,979,511 B2 | 12/2005 | Visco | |
| 7,150,927 B2 | 12/2006 | Hickey et al. | |
| 7,157,173 B2 | 1/2007 | Kwon | |
| 7,255,956 B2 | 8/2007 | McElroy | |
| 7,494,732 B2 | 2/2009 | Roy | |
| 7,550,217 B2 | 6/2009 | Kwon | |
| 7,563,503 B2 | 7/2009 | Gell | |
| 7,601,183 B2 | 10/2009 | Larsen | |
| 7,968,245 B2 | 6/2011 | Gottmann et al. | |
| 8,748,056 B2 * | 6/2014 | Batawi | H01M 4/861 429/484 |
| 2001/0049035 A1 | 12/2001 | Haltiner, Jr. et al. | |
| 2002/0012825 A1 | 1/2002 | Sasahara et al. | |
| 2002/0014417 A1 | 2/2002 | Kuehnle et al. | |
| 2002/0028362 A1 | 3/2002 | Prediger et al. | |
| 2002/0028367 A1 | 3/2002 | Sammes et al. | |
| 2002/0058175 A1 | 5/2002 | Ruhl | |
| 2002/0098406 A1 | 7/2002 | Huang et al. | |
| 2002/0106544 A1 | 8/2002 | Noetzel et al. | |
| 2002/0127455 A1 | 9/2002 | Pham et al. | |
| 2002/0132156 A1 | 9/2002 | Ruhl et al. | |
| 2002/0177031 A1 | 11/2002 | Doshi et al. | |
| 2003/0162067 A1 | 8/2003 | McElroy | |
| 2003/0165732 A1 | 9/2003 | McElroy | |
| 2003/0196893 A1 | 10/2003 | McElroy et al. | |
| 2004/0018409 A1 | 1/2004 | Hui et al. | |
| 2004/0081859 A1 | 4/2004 | McElroy et al. | |

(56) References Cited

U.S. PATENT DOCUMENTS

| | | |
|---|---|---|
| 2004/0191595 A1 | 9/2004 | McElroy et al. |
| 2004/0191597 A1 | 9/2004 | McElroy |
| 2004/0191598 A1 | 9/2004 | Gottmann et al. |
| 2004/0202914 A1 | 10/2004 | Sridhar et al. |
| 2004/0224193 A1 | 11/2004 | Mitlitsky et al. |
| 2005/0048334 A1 | 3/2005 | Sridhar et al. |
| 2005/0074650 A1 | 4/2005 | Sridhar et al. |
| 2005/0164051 A1 | 7/2005 | Venkataraman et al. |
| 2005/0227134 A1 | 10/2005 | Nguyen |
| 2005/0271919 A1 | 12/2005 | Hata et al. |
| 2006/0008682 A1 | 1/2006 | McLean et al. |
| 2006/0040168 A1 | 2/2006 | Sridhar |
| 2006/0166070 A1 | 7/2006 | Hickey et al. |
| 2006/0216575 A1 | 9/2006 | Cassidy |
| 2006/0222929 A1 | 10/2006 | Hickey et al. |
| 2007/0045125 A1 | 3/2007 | Hartvigsen et al. |
| 2007/0082254 A1 | 4/2007 | Hiwatashi |
| 2007/0141423 A1 | 6/2007 | Suzuki |
| 2007/0141443 A1 | 6/2007 | Brown |
| 2007/0141444 A1 | 6/2007 | Brown |
| 2007/0224481 A1 | 9/2007 | Suzuki et al. |
| 2007/0237999 A1 | 10/2007 | Donahue et al. |
| 2007/0275292 A1 | 11/2007 | Sin Xicola et al. |
| 2007/0287048 A1 | 12/2007 | Couse et al. |
| 2008/0029388 A1 | 2/2008 | Elangovan et al. |
| 2008/0075984 A1 | 3/2008 | Badding et al. |
| 2008/0076006 A1 | 3/2008 | Gottmann et al. |
| 2008/0096080 A1 | 4/2008 | Batawi et al. |
| 2008/0102337 A1 | 5/2008 | Shimada |
| 2008/0166618 A1* | 7/2008 | Larsen ............... H01M 4/8605 429/489 |
| 2008/0254336 A1 | 10/2008 | Batawi |
| 2008/0261099 A1 | 10/2008 | Nguyen et al. |
| 2009/0029195 A1 | 1/2009 | Gauckler et al. |
| 2009/0061284 A1 | 3/2009 | Blennow et al. |
| 2009/0068533 A1 | 3/2009 | Fukasawa et al. |
| 2009/0186250 A1 | 7/2009 | Narendar et al. |
| 2009/0214919 A1 | 8/2009 | Suzuki et al. |
| 2009/0291347 A1 | 11/2009 | Suzuki et al. |
| 2011/0039183 A1 | 2/2011 | Armstrong et al. |

FOREIGN PATENT DOCUMENTS

| | | |
|---|---|---|
| GB | 1048839 A | 11/1966 |
| JP | 3196465 A | 8/1991 |
| JP | 6215778 | 8/1994 |
| JP | 2000-281438 | 10/2000 |
| JP | 2004-531857 A | 10/2004 |
| JP | 2008-239353 A | 10/2008 |
| JP | 2008-541336 A | 11/2008 |
| JP | 2009-110933 A | 5/2009 |
| KR | 20020092223 A | 12/2002 |
| KR | 20070095440 A | 9/2007 |
| KR | 20080010737 A | 1/2008 |
| KR | 20080097971 | 11/2008 |
| KR | 100886239 B1 | 2/2009 |
| KR | 20090061870 A | 6/2009 |
| WO | WO2004/093214 | 10/2004 |
| WO | WO2005/041329 | 5/2005 |
| WO | WO-2006079558 A1 * | 8/2006 .......... H01M 4/8605 |
| WO | WO2008/019926 | 2/2008 |
| WO | WO2009/097110 | 8/2009 |

OTHER PUBLICATIONS

Mori et al., "Lanthanum Alkaline-Earth Manganites as a Cathode Material in High-Temperature Solid Oxide Fuel Cells," Journal of the Electrochemical Society, 1999, p. 4041-4047, vol. 146.

L.G. Austin, "Cell & Stack Construction: Low Temperature Cells," NASA SP-120, 1967.

EG & G Services, Parsons, Inc., SAIC, Fuel Cell Handbook, 5th Edition, USDOE, Oct. 2000, p. 9-1-9.4, and 9-12-9.14.

J.M. Sedlak, et al. "Hydrogen Recovery and Purification Using the Solid Polymer Electrolyte Electrolysis Cell," Int. J. Hydrogen Energy, vol. 6, p. 45-51, 1981.

Dr. Ruhl, "Low Cost Reversible Fuel Cell System," Proceedings of the 2000 U.S. DOE Hydrogen Program Review, Jun. 15, 2000, NREL/CP-570-30535.

Low Cost, Compact Solid Oxide Fuel Cell Generator, NASA Small Business Innovation Research Program, (date unavailable).

Low Cost, High Efficiency Reversible Fuel Cell (and Electrolyzer) Systems, Proceedings of the 2001 DOE Hydrogen Program Review NREL/CP-570-30535.

Milliken et al., "Low Cost, High Efficiency Reversible Fuel Cell Systems," Proceedings of the 2002 U.S. DOE Hydrogen Program Review, NREL/CP-610-32405.

K. Eguchi et al., Power Generation and Steam Electrolysis Characteristics of an Electrochemical Cell with a Zirconia or Ceria based Electrode, Solid State Ionics, 86 88, 1996, p. 1245-49.

F. Mitlitsky et al., "Regenerative Fuel Cells for High Altitude Long Endurance Solar Powered Aircraft," 28$^{th}$ Intersociety Energy Conversion Engineering Conference (IECED), Jul. 28, 1993, UCRL-JC-113485.

Small, Ultra Efficient Fuel Cell Systems, Advanced Technology Program, ATP 2001 Competition, Jun. 2002.

F. Mitlitsky et al., Unitized Regenerative Fuel Cells for Solar Rechargeable Aircraft and Zero Emission Vehicles, 1994 Fuel Cell Seminar, Sep. 6, 1994, UCRL-JC-117130.

Ralph et al., "Cathode Materials for Reduced-Temperature SOFCs," Journal of the Electrochemical Society, 2003, p. A1518-A1522, vol. 150.

Simmer et al., "Development of Fabrication Techniques and Electrodes for Solid Oxide Fuel Cells," Electrochemcial Society Proceedings, p. 1050-1061, vol. 2001-16.

Yamamoto et al., "Electrical Conductivity of Stabilized Zirconia with Ytterbia and Scandia," Solid State Ionics, v79, p. 137-142, Jul. 1995.

Araki et al., "Degradation Mechanism of Scandia-Stabilized Zirconia Electrolytes: Discussion based on Annealing Effects on Mechanical Strength, Ionic Conductivity, and Raman Spectrum," Solid State Ionics, v180, n28-31, p. 1484-1489, Nov. 2009.

Lybye et al., "Effect of Transition Metal Ions on the Conductivity and Stability of Stabilized Zirconia," Ceramic Engineering and Science Proceedings, v27, n4, p. 67-78, 2006.

* cited by examiner

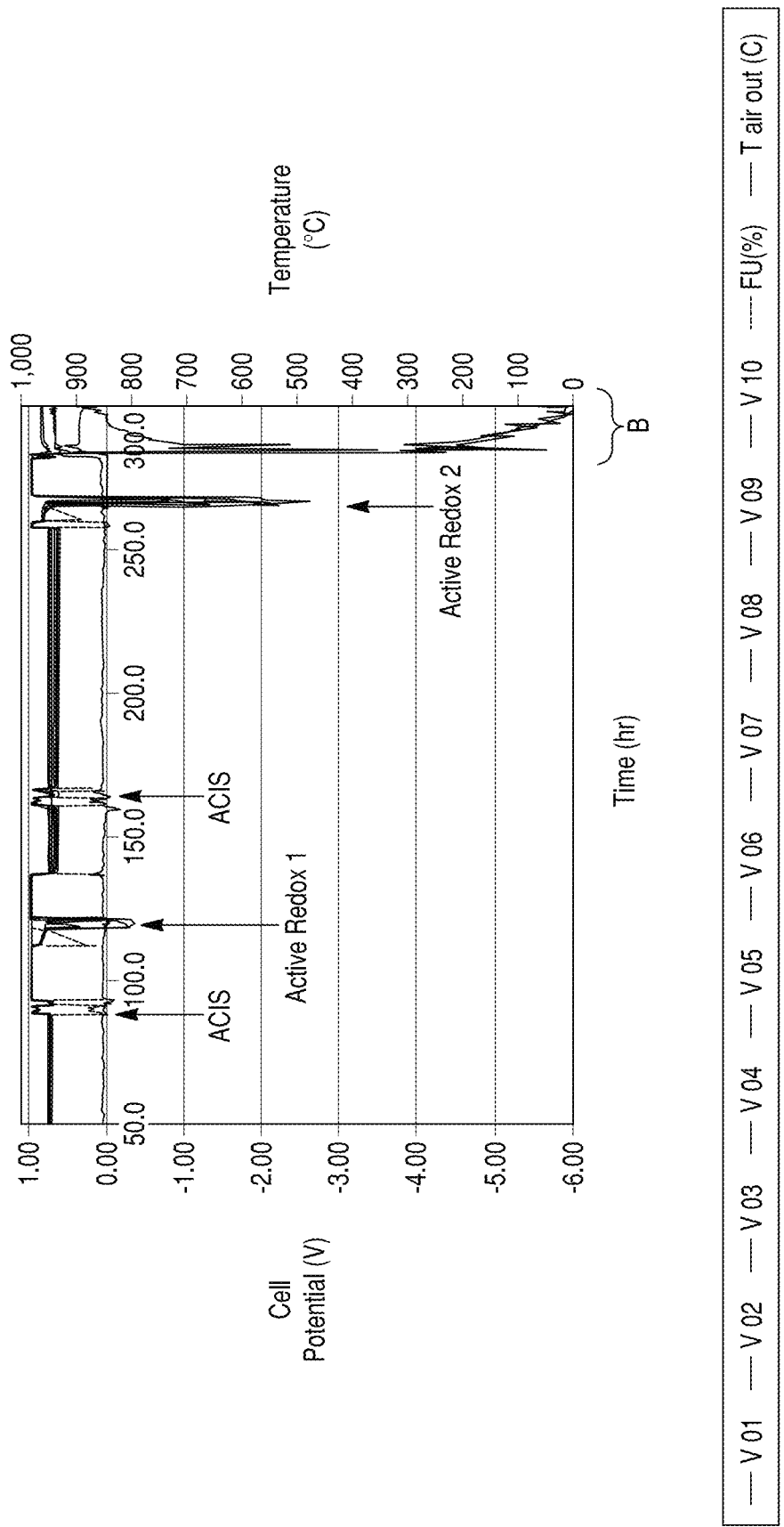

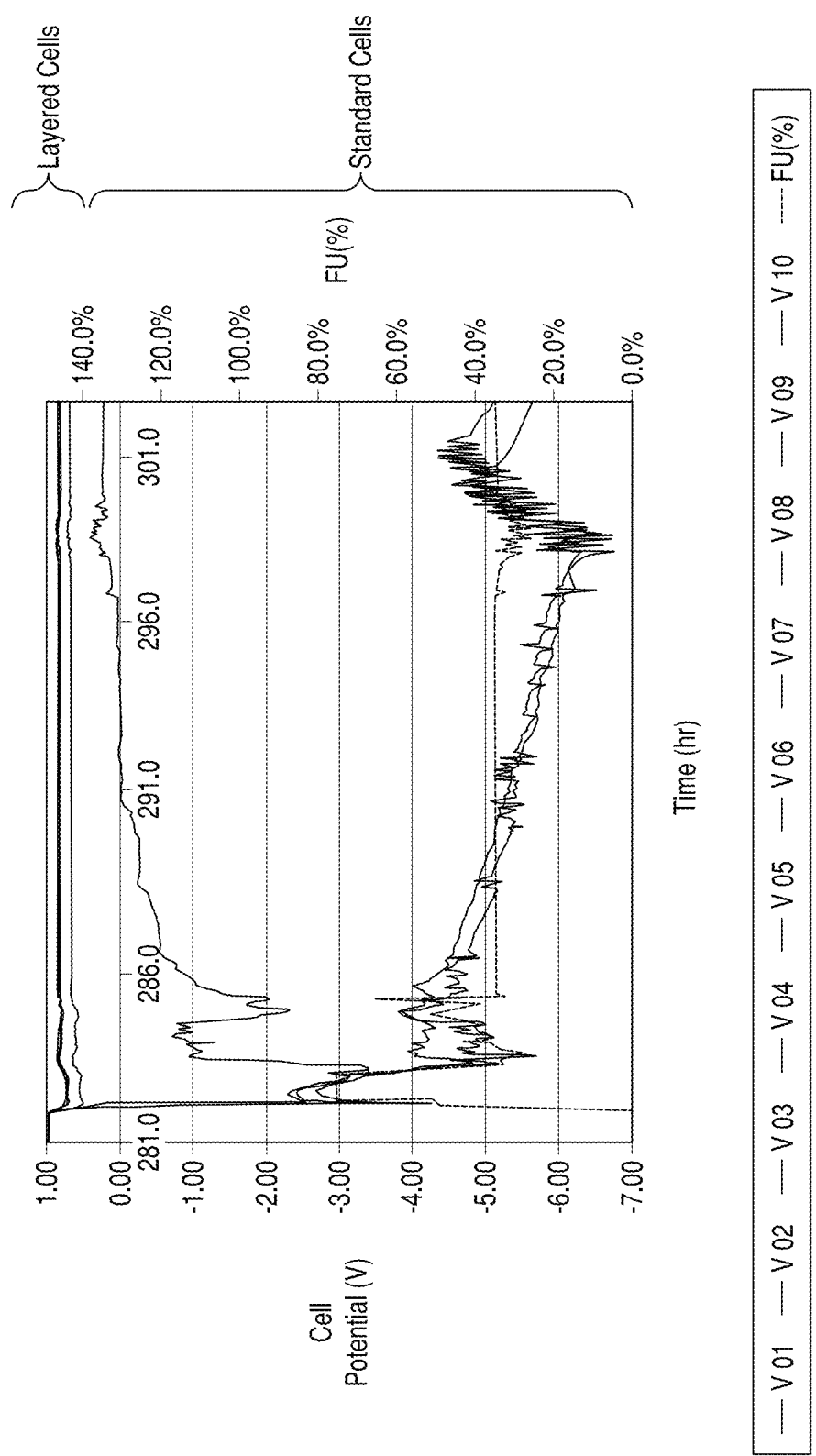

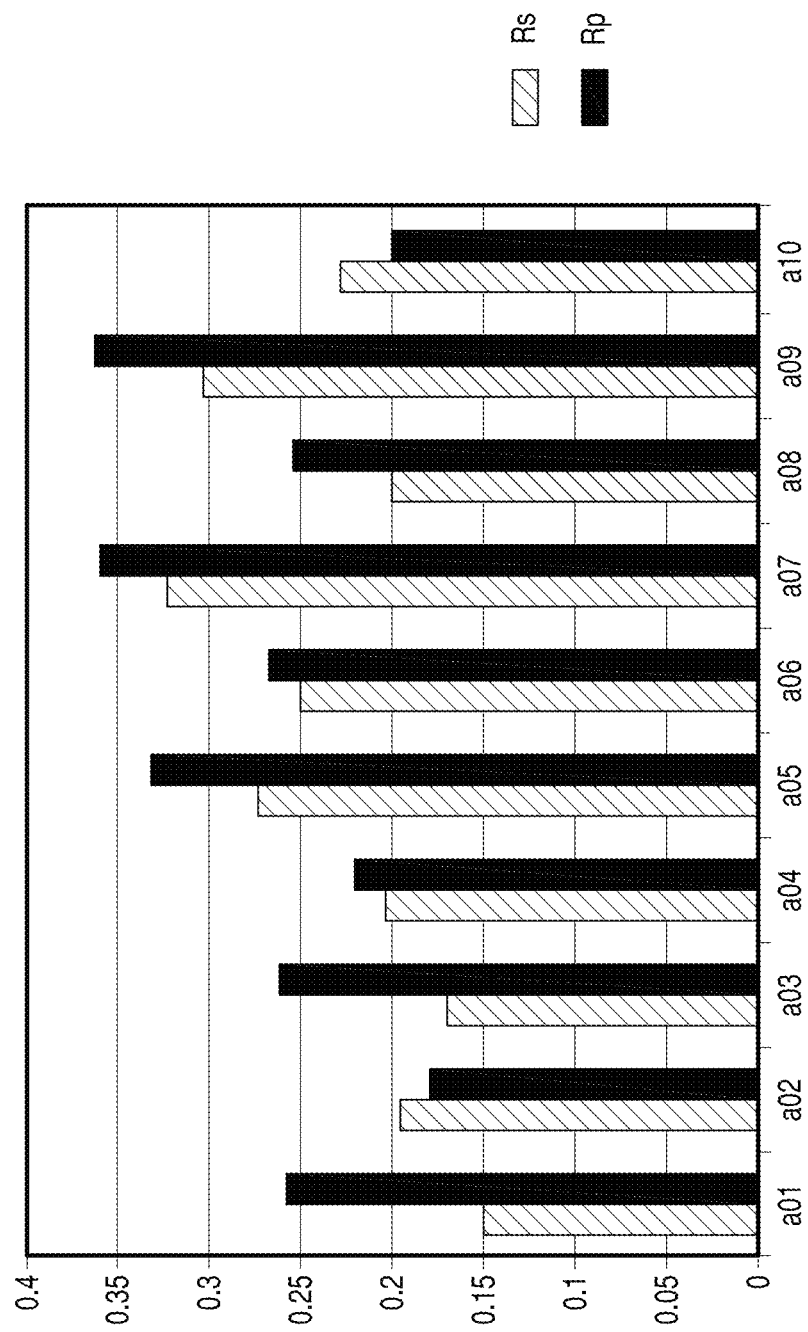

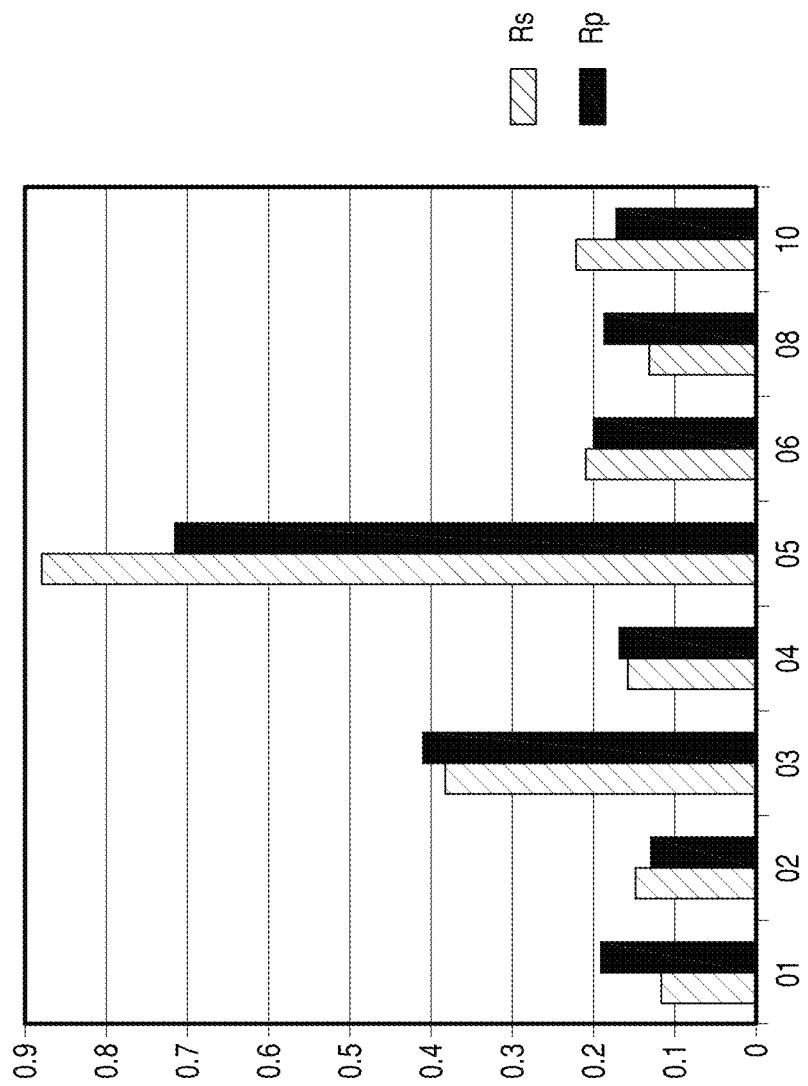

ANODE WITH HIGH REDOX STABILITY

This application is a continuation-in-part of U.S. application Ser. No. 14/270,686, filed May 6, 2014, which is a divisional of U.S. application Ser. No. 11/907,204, filed Oct. 10, 2007, which claims benefit of priority of U.S. Provisional Patent Application Ser. No. 60/852,396 filed on Oct. 18, 2006, which are incorporated by reference in their entirety.

BACKGROUND OF THE INVENTION

The present invention is generally directed to fuel cell components, and to solid oxide fuel cell anode materials in particular.

Fuel cells are electrochemical devices which can convert energy stored in fuels to electrical energy with high efficiencies. Electrolyzer cells are electrochemical devices which can use electrical energy to reduce a given material, such as water, to generate a fuel, such as hydrogen. The fuel and electrolyzer cells may comprise reversible cells which operate in both fuel cell and electrolysis mode.

In a high temperature fuel cell system, such as a solid oxide fuel cell (SOFC) system, an oxidizing flow is passed through the cathode side of the fuel cell while a fuel flow is passed through the anode side of the fuel cell. The oxidizing flow is typically air, while the fuel flow can be a hydrocarbon fuel, such as methane, natural gas, pentane, ethanol, or methanol. The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit. A solid oxide reversible fuel cell (SORFC) system generates electrical energy and reactant product (i.e., oxidized fuel) from fuel and oxidizer in a fuel cell or discharge mode and generates the fuel and oxidant using electrical energy in an electrolysis or charge mode.

Anode electrodes operating under conditions of extreme fuel starvation are usually irreversibly damaged. Such starvation conditions are usually encountered in stacks where isolated repeat elements (i.e., specific fuel cells) obtain less fuel than their neighboring elements (i.e., the neighboring fuel cells). These elements witness effective fuel utilization in excess of 100%. Similar conditions may arise during system transitions or operating anomalies where the fuel supply to the cell does not correspond to the current drawn. Under these circumstances, the oxygen ion flux to the anode will oxidize the anode constituents. Nickel present at the three phase boundary of traditional anodes will instantaneously oxidize. The phase change from Ni metal to NiO is accompanied by a change in volume that causes mechanical damage at the anode/electrolyte interface. This mechanical damage is characterized by delamination of the electrode from the electrolyte which increases the specific resistance of the cell and dramatically decreases the stack performance. To avoid oxidation of the nickel and mechanical damage of the electrode electrolyte interface, which leads to delamination, one prior art solution was to employ an all ceramic anode. While the ceramic anodes show better stability in starvation conditions, they are associated with high polarization losses.

SUMMARY OF THE INVENTION

One aspect of the present invention provides a solid oxide fuel cell (SOFC) comprising a cathode electrode, a solid oxide electrolyte and an anode electrode comprising a first portion comprising a cermet containing a nonzero volume percent of a nickel containing phase and a nonzero volume percent of a ceramic phase and a second portion comprising a cermet containing a nonzero volume percent of a nickel containing phase and a nonzero volume percent of a ceramic phase, such that the first portion is located between the electrolyte and the second portion. The SOFC is an electrolyte-supported SOFC and the first portion of the anode electrode contains a lower ratio of the nickel containing phase to the ceramic phase than the second portion of the anode electrode. The first portion of the anode electrode has a porosity of 5-30 volume percent and the second portion of the anode electrode has a porosity of 31-60 volume percent.

Another aspect of the present invention provides a solid oxide fuel cell (SOFC) comprising a cathode electrode, a solid oxide electrolyte and an anode electrode comprising a first portion comprising a cermet containing a nonzero volume percent of a metal containing phase and a nonzero volume percent of a ceramic phase and a second portion comprising a cermet containing a nonzero volume percent of a metal containing phase and a nonzero volume percent of a ceramic phase, such that the first portion is located between the electrolyte and the second portion. The SOFC is an electrolyte-supported SOFC and the first portion of the anode electrode contains a lower ratio of the metal containing phase to the ceramic phase than the second portion of the anode electrode. The first portion of the anode electrode has a porosity of 5-30 volume percent and the second portion of the anode electrode has a porosity of 31-60 volume percent.

BRIEF DESCRIPTION OF THE DRAWINGS

FIGS. 6A and 6B are plots of cell potential versus time for a ten cell stack containing cells according to an embodiment of the invention and cells according to a comparative example.

FIGS. 7A, 7B and 7C are resistance bar graphs for the ten cells of the stack containing cells according to an embodiment of the invention and cells according to a comparative example.

DETAILED DESCRIPTION OF THE EMBODIMENTS

The embodiments of the invention provide anode electrodes for solid oxide fuel cells, such as reversible SOFCs (i.e., SORFC) and non-reversible SOFCs, that do not irreversibly deteriorate under conditions of fuel starvation. The anode electrodes are highly active and show low polarization losses that are comparable to prior art Ni—YSZ anodes. However, they also show a marked improvement in their capability to operate under conditions of fuel starvation. Furthermore, after the starvation event, the performance of the anode electrodes of the embodiments of the invention is hardly affected.

The anode electrode of one embodiment of the invention comprises a cermet comprising a nickel containing phase and a ceramic phase. The nickel containing phase preferably consists entirely of nickel in a reduced state. This phase forms nickel oxide when it is in an oxidized state. Thus, the anode electrode is preferably annealed in a reducing atmosphere prior to operation to reduce the nickel oxide to nickel. The nickel containing phase may include other metals in additional to nickel and/or nickel alloys. The nickel is preferably finely distributed in the ceramic phase, with an average grain size less than 500 nanometers, such as 200 to 400 nanometers, to reduce the stresses induced when nickel converts to nickel oxide. The ceramic phase preferably comprises a doped ceria, such as a samaria, gadolinia or yttria doped ceria (in other words, the ceria may contain Sm, Gd and/or Y dopant element which forms an oxide upon incorporation into the ceria). Preferably, the doped ceria phase composition comprises Ce(1-x)AxO2, where A comprises at least one of Sm, Gd, or Y, and x is greater than 0.1 but less than 0.4. For example, x may range from 0.15 to 0.3 and may be equal to 0.2. Samaria doped ceria (SDC) is preferred. Furthermore, the doped ceria may be non-stoichiometric, and contain more than or less than two oxygen atoms for each one metal atom. Alternatively, the ceramic phase comprises a different mixed ionic and electrically conductive phase, such as a perovskite ceramic phase, such as (La, Sr)(Mn,Cr)O3, which includes LSM, lanthanum strontium chromite, (LaxSr1-x)(MnyCr1-y)O3 where $0.6<x<0.9$, $0.1<y<0.4$, such as x=0.8, y=0.2, etc.

In one embodiment of the invention, the anode electrode contains less nickel phase in a portion near the electrolyte than in a portion near the electrode surface distal from the electrode (i.e., the "free" electrode surface which faces away from the electrolyte). In another embodiment of the invention, the anode electrode contains less porosity in a portion near the electrolyte than in a portion near the "free" electrode surface distal from the electrode. Preferably, the anode electrode contains less nickel and less porosity in the portion near the electrolyte.

Figure 1:
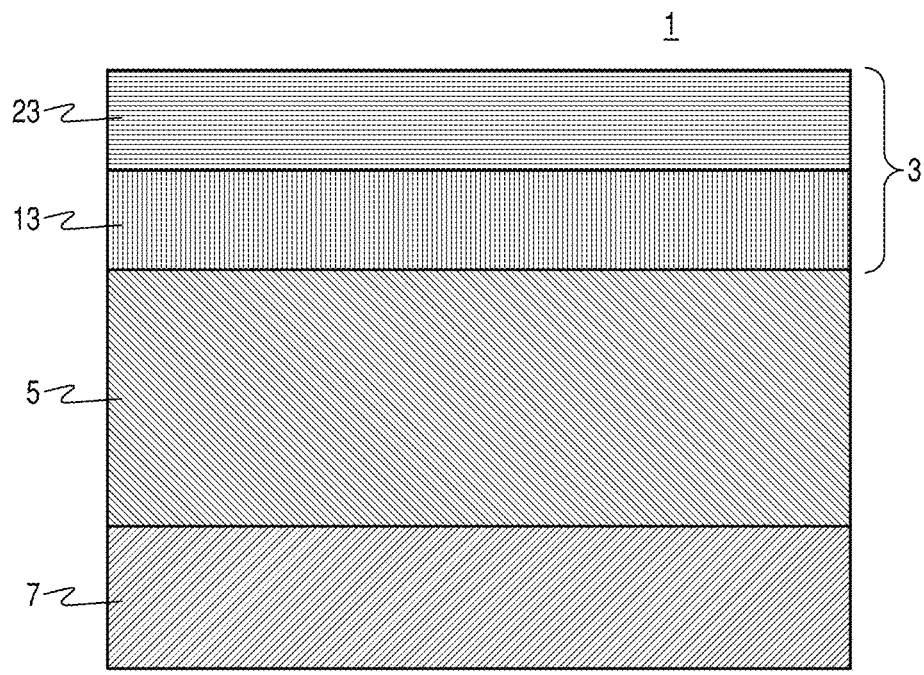
FIGS. 1 and 2 illustrate side cross-sectional views and FIG. 3 illustrates a top view of SOFCs of the embodiments of the invention.

FIG. 1 illustrates a solid oxide fuel cell (SOFC) 1 according to an embodiment of the invention. The cell 1 includes an anode electrode 3, a solid oxide electrolyte 5 and a cathode electrode 7. The electrolyte 5 may comprise a stabilized zirconia, such as scandia stabilized zirconia (SSZ) or yttria stabilized zirconia (YSZ). Alternatively, the electrolyte 5 may comprise another ionically conductive material, such as a doped ceria. The cathode electrode 7 may comprise an electrically conductive material, such as an electrically conductive perovskite material, such as lanthanum strontium manganite (LSM). Other conductive perovskites, such as LSCo, etc., or metals, such as Pt, may also be used.

As shown in FIG. 1, the anode electrode 3 comprises a first portion 13 and a second potion 23. The first portion 13 is located between the electrolyte 5 and the second portion 23. As noted above, preferably, the first portion of the anode electrode 13 contains a lower ratio of the nickel containing phase to the ceramic phase than the second portion 23 of the anode electrode. Furthermore, preferably, the first portion of the anode electrode 13 contains a lower porosity than the second portion 23 of the anode electrode. Thus, the porosity and the ratio of the nickel phase to the ceramic phase increases in as a function of thickness of the anode electrode 3 in a direction from the electrolyte 5 to the opposite surface of the anode electrode 3.

For example, the first portion 13 of the anode electrode may contain a porosity of 5-30 volume percent and a nickel phase content of 1 to 20 volume percent. The second portion 23 of the anode electrode may contain a porosity of 31 to 60 volume percent and a nickel phase content of 21 to 60 volume percent.

In one embodiment, the first 13 and the second 23 portions of the anode electrode 3 comprise separate sublayers. Thus, the first region 13 comprises a first sublayer in contact with the electrolyte 5 and the second region 23 comprises a second sublayer located over the first sublayer 13. The first sublayer 13 contains a lower porosity and lower nickel to doped ceria ratio than the second sublayer 23

The first sublayer 13 may contain between 1 and 15 volume percent of the nickel containing phase, between 5 and 30 percent pores, such as between 5 and 20 or between 15 and 25 volume percent pores, and remainder the doped ceria phase, for example between 1 and 5 volume percent of the nickel containing phase, between 5 and 10 volume percent pores and remainder the doped ceria phase. The second sublayer 23 contains over 20 volume percent nickel containing phase, between 20 and 60 volume percent pores, such as between 40 and 50 percent pores, and remainder the doped ceria phase, such as between 30 and 50 volume percent of the nickel containing phase, between 30 and 50 volume percent pores and remainder the doped ceria phase. In the first sublayer 13, the volume ratio of the nickel containing phase to the doped ceria containing phase may range from 1:8 to 1:10, for example 1:9. In the second sublayer 23, the volume ratio of the nickel containing phase to the doped ceria containing phase may range from 3:1 to 5:1, for example 4:1. The first sublayer 13 may contain between 5 and 25 weight percent nickel containing phase, such as between 10 and 20 weight percent nickel containing phase, and between 75 and 95 weight percent doped ceria containing phase, such as between 80 and 90 weight percent doped ceria phase. The second sublayer 23 may contain between 60 and 85 weight percent nickel containing phase, such as between 70 and 75 weight percent nickel containing phase, and between 15 and 40 weight percent doped ceria containing phase, such as between 25 and 30 weight percent doped ceria phase. Optionally, sublayers 13 and/or 23 may contain other materials or phases besides the nickel containing phase and the doped ceria containing phase.

Thus, the anode electrode 3 contains plurality of sublayers, each varying in composition, structure and nickel content. Each layer is approximately 3-30 microns thick, such as 5-10 microns thick, for example. The first layer in contact with the electrolyte has a higher density and lower nickel content than the one or more layers further away from the electrolyte. A porosity gradient is established ranging from approximately 5-15% close to the electrolyte and increasing to about 50% at the anode electrode's free surface. The nickel content in the electrode increases in a similar manner as the porosity.

In another embodiment of the invention, each of the first 13 and second 23 regions may comprise plural sublayers. For example, each region 13, 23 may contain two sublayers, such that the anode electrode 3 contains a total of four sublayers. In this case, the first region 13 comprises a first sublayer in contact with the electrolyte and a second sublayer located over the first sublayer, while the second region 23 comprises a third sublayer located over the second sublayer and a fourth sublayer located over the third sublayer. In this configuration, a porosity of the anode electrode increases from the first sublayer to the fourth sublayer and the nickel phase content of the anode electrode increases from the first sublayer to the fourth sublayer. In other words, the sublayer which contacts the electrolyte 5 has the lowest porosity and nickel phase content, while the sublayer which is located farthest from the electrolyte contains the highest porosity and nickel phase content (and the lowest doped ceria phase content).

For example, the first sublayer closest to the electrolyte 5 may contain between 1 and 5 volume percent of the nickel containing phase, between 5 and 15 volume percent pores and remainder the doped ceria phase. The second sublayer may contain between 6 and 20 volume percent of the nickel containing phase, between 20 and 40 volume percent pores and remainder the doped ceria phase. The third sublayer may contain between 25 and 35 volume percent of the nickel containing phase, between 30 and 50 volume percent pores and remainder the doped ceria phase. The fourth sublayer which is farthest from the electrolyte 5 may contain between 35 and 45 volume percent of the nickel containing phase, between 40 and 60 volume percent pores and remainder the doped ceria phase.

Figure 2:
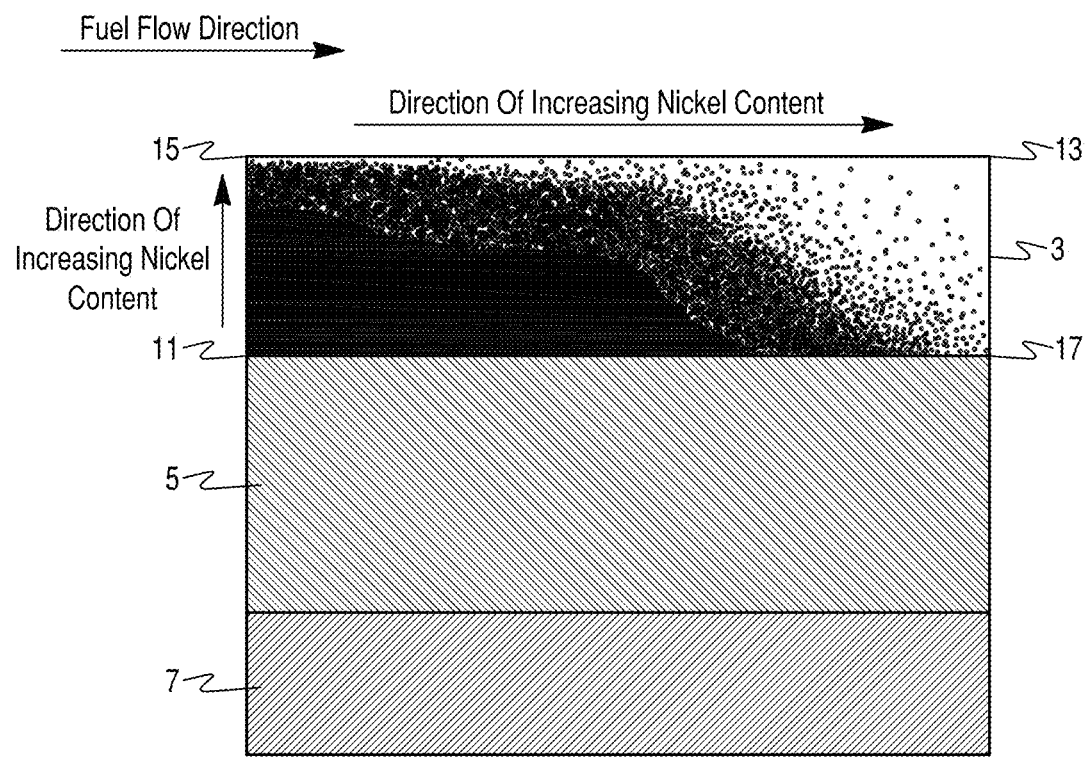

In another embodiment of the invention shown in FIG. 2, the anode electrode 3 comprises a single layer having a graded composition. In the anode electrode 3 shown in FIG. 2, the volume fraction of the nickel containing phase and a porosity in the anode electrode increases from an interface between the electrolyte 5 and the anode electrode 3 to the "free" surface of the anode electrode distal from the electrolyte 5.

Figure 3:
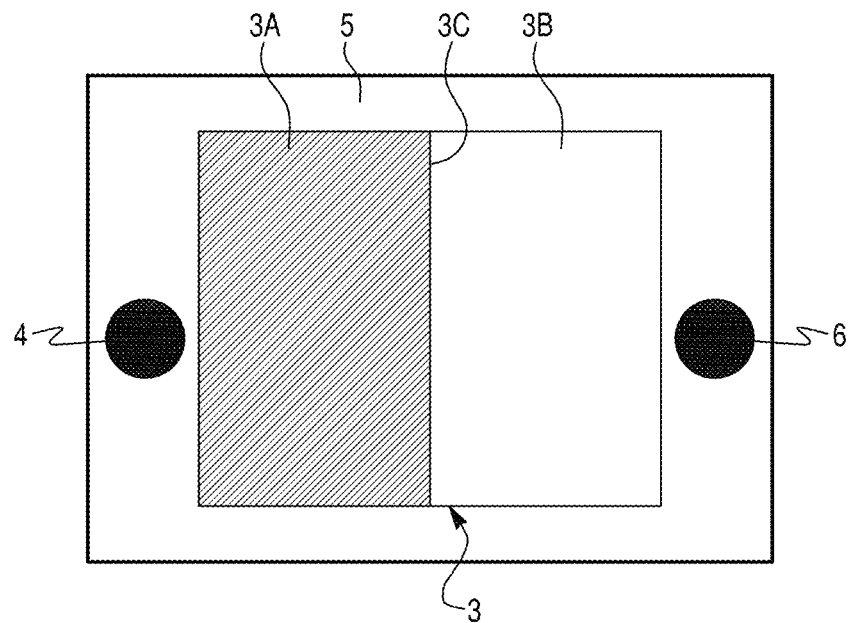

In another embodiment of the invention shown in FIGS. 2 and 3, a first region 3A of the anode electrode 3 located adjacent to a fuel inlet 4 contains a lower ratio of the nickel containing phase to the ceramic phase than the second region 3B of the anode electrode located adjacent to a fuel outlet 6. The first 3A and the second 3B regions are located adjacent to a surface of the anode electrode distal from the electrolyte 5.

For example, in stacks which are internally manifolded for fuel, the fuel inlet 4 comprises a fuel inlet riser opening. A fuel inlet riser is a series of connected openings through the gas separator plates and/or through one or more layers of the SOFC, such as the anode, cathode, and/or electrolyte. The SOFC also contains a corresponding fuel outlet 6. It should be noted that the fuel cells do not necessarily have to be internally manifolded and may comprise externally manifolded cells. In this case, the fuel inlet and outlet comprise openings from a fuel manifold near the edges of the fuel cells.

Thus, as shown in FIG. 3, the region 3A adjacent to the fuel inlet 4 is relatively nickel poor and doped ceria rich, while the region 3B adjacent to the fuel outlet is relatively nickel rich and doped ceria poor. Regions 3A and 3B may have the same area as each other or they may have a different area from each other. While the boundary line 3C between the regions 3A, 3B is shown as a straight line in FIG. 3, this boundary 3C may have other shapes, such as a curved line (convex toward inlet 4 or outlet 6), a jagged line, a battlement shaped line, or other zigzag or non-straight shaped line. Furthermore, instead of a sharp boundary line 3C between regions 3A and 3B, the nickel content may gradually increase from inlet 4 to outlet 6 while the doped ceria content may gradually decrease from inlet 4 to outlet 6.

FIG. 2 shows an embodiment of the invention in which the nickel content varies in two directions in the anode electrode. For example, the nickel content varies in the thickness direction of the anode electrode as well as in the fuel flow direction from the fuel inlet to the fuel outlet. The fuel flow stream enters the SOFC 1 at fuel inlet 4 and exits at fuel outlet 6, as shown by the arrow in FIG. 2. Thus, the nickel content increases and the doped ceria content decreases in: i) the thickness direction from an interface between the electrolyte 5 and the anode electrode 3 to the "free" surface of the anode electrode distal from the electrolyte 5, and ii) in the direction from the fuel inlet 4 to the fuel outlet 6. The low nickel/high doped ceria regions in the anode electrode 3 are shown in FIG. 2 in darker color than the high nickel/low doped ceria regions. Thus, as shown in FIG. 2, the lower left quadrant of the anode electrode 3 adjacent to the fuel inlet 4 and adjacent to the electrolyte 5 contains a lowest ratio of the nickel containing phase to the ceramic phase in the anode electrode. The upper right quadrant of the anode electrode 3 adjacent to the fuel outlet 6 and distal from the electrolyte 5 contains a highest ratio of the nickel containing phase to the ceramic phase in the anode electrode. For example, the upper right quadrant may contain an 80:20 volume ratio of the nickel phase to the doped ceria phase.

Figure 4:
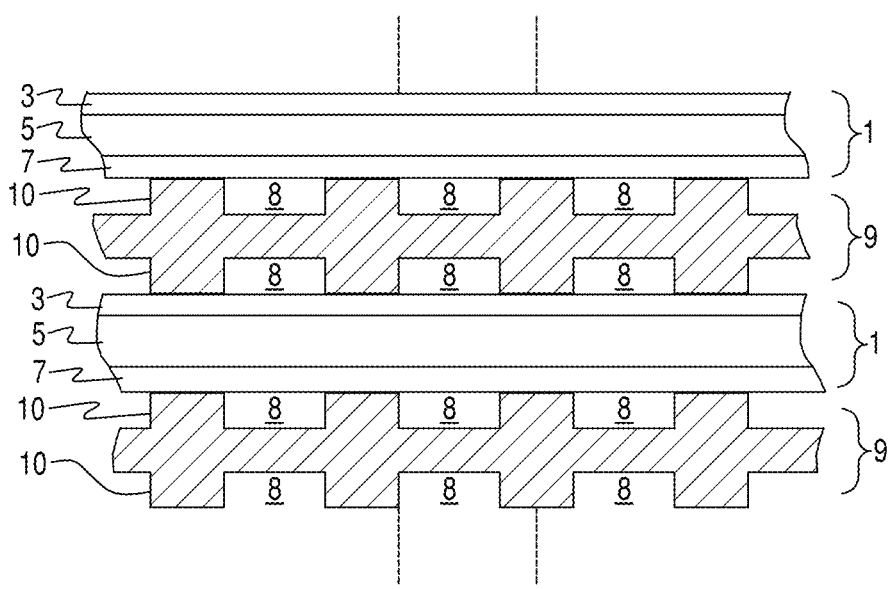
FIG. 4 illustrates a side cross sectional view of a SOFC stack of an embodiment of the invention.

Fuel cell stacks are frequently built from a multiplicity of SOFC's 1 in the form of planar elements, tubes, or other geometries. Fuel and air has to be provided to the electrochemically active surface, which can be large. As shown in FIG. 4, one component of a fuel cell stack is the so called gas flow separator (referred to as a gas flow separator plate in a planar stack) 9 that separates the individual cells in the stack. The gas flow separator plate separates fuel, such as a hydrocarbon fuel, flowing to the fuel electrode (i.e. anode 3) of one cell in the stack from oxidant, such as air, flowing to the air electrode (i.e. cathode 7) of an adjacent cell in the stack. The separator 9 contains gas flow passages or channels 8 between the ribs 10. Frequently, the gas flow separator plate 9 is also used as an interconnect which electrically connects the fuel electrode 3 of one cell to the air electrode 7 of the adjacent cell. In this case, the gas flow separator plate which functions as an interconnect is made of or contains electrically conductive material. An electrically conductive contact layer, such as a nickel contact layer, may be provided between the anode electrode and the interconnect. FIG. 4 shows that the lower SOFC 1 is located between two gas separator plates 9.

Furthermore, while FIG. 4 shows that the stack comprises a plurality of planar or plate shaped fuel cells, the fuel cells may have other configurations, such as tubular. Still further, while vertically oriented stacks are shown in FIG. 4, the fuel cells may be stacked horizontally or in any other suitable direction between vertical and horizontal.

The term "fuel cell stack," as used herein, means a plurality of stacked fuel cells which share a common fuel inlet and exhaust passages or risers. The "fuel cell stack," as used herein, includes a distinct electrical entity which contains two end plates which are connected to power conditioning equipment and the power (i.e., electricity) output of the stack. Thus, in some configurations, the electrical power output from such a distinct electrical entity may be separately controlled from other stacks. The term "fuel cell stack" as used herein, also includes a part of the distinct electrical entity. For example, the stacks may share the same end plates. In this case, the stacks jointly comprise a distinct electrical entity. In this case, the electrical power output from both stacks cannot be separately controlled.

A method of forming a planar, electrolyte supported SOFC 1 shown in FIGS. 1, 2 and 3 includes forming the cathode electrode 7 on a first side of a planar solid oxide electrolyte 5 and forming the cermet anode electrode 3 on a second side of the planar solid oxide electrode, such that a first portion of the anode electrode adjacent to the electrolyte contains a lower porosity and a lower ratio of the nickel containing phase to the ceramic phase than the second portion of the anode electrode located distal from the electrolyte. The anode and the cathode may be formed in any order on the opposite sides of the electrolyte.

The anode electrode containing a plurality of sublayers shown in FIG. 1 may be formed by a screen printing method or by other suitable methods. For example, a first sublayer 13 containing a low porosity and a low nickel content can be screen printed on the electrolyte 5, followed by screen printing a second sublayer 23 with a higher porosity and a higher nickel content on the first sublayer 13.

The single layer anode electrode shown in FIG. 2 may be formed by ink jet printing or other suitable method. During the deposition, the nickel content and porosity is varied in different regions of the anode electrode to form an anode electrode with a graded composition. The graded composition may comprise a uniformly or a non-uniformly graded composition in a thickness direction of the anode electrode. In this case, the ratio of the nickel to doped ceria precursor material is increased as the thickness of the deposited layer increases. Furthermore, the anode composition can be graded uniformly or non-uniformly in a direction from a fuel inlet to a fuel outlet, such as by using plural nozzles which provide a different nickel/doped ceria ratio precursor materials to different regions of the anode electrode.

The anode electrode contains a doped ceria phase rich interface at a three phase boundary with the electrolyte and a nickel phase rich region adjacent to the "free" surface of the anode electrode which is distal from the electrolyte (i.e., the surface of the anode 3 which faces the interconnect 9). Without wishing to be bound by a particular theory, the present inventors believe that the greater stability of the anode electrodes of the embodiments of the present invention under conditions of very high fuel utilization can be primarily attributed to the presence of the ceria rich interface at the three phase boundary. The mixed ionic and electronic conducting nature of the doped ceria acts as a buffer to the oxygen ion flux through the electrolyte, thus mitigating the rapid conversion of nickel to nickel oxide. Mechanical damage of the electrode/electrolyte is avoided and upon the establishment of normal operating conditions, minimal polarization change in the anode is observed. Because the ceria-based ceramic has a lower electronic conductivity than nickel, the presence of a small amount of nickel improves the conductivity of the first sublayer(s) without causing any deleterious effect to the mechanical stability under fuel starvation conditions.

A typical example of a multi-sublayer anode electrode is provided in Table 1 where four sublayers are described.

TABLE 1

| Sublayer | Volume fraction pores | Volume fraction Ni | Volume fraction ceramic phase | Thickness (microns) |
|---|---|---|---|---|
| 1 | 10 | 5 | 85 of $Ce_{0.8}Sm_{0.2}O_2$ | 7 |
| 2 | 30 | 15 | 55 of $Ce_{0.8}Sm_{0.2}O_2$ | 7 |
| 3 | 40 | 30 | 30 of $Ce_{0.8}Sm_{0.2}O_2$ | 10 |
| 4 | 50 | 40 | 10 $Ce_{0.8}Sm_{0.2}O_2$ | 10 |

It should be noted that some of these sublayers can be combined into fewer sublayers resulting in steeper gradients.

For example, sublayers 1 and 2 may be replaced with a single lower sublayer having the average value of porosity and nickel volume fraction of sublayers 1 and 2. Sublayers 3 and 4 may be replaced with a single upper sublayer having the average value of porosity and nickel volume fraction of sublayers 3 and 4.

Figure 5A:
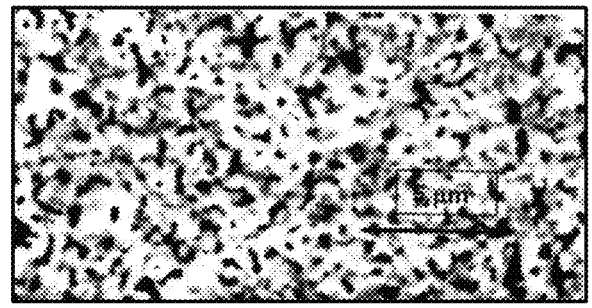
FIGS. 5A-5D are micrographs of an anode sublayers of embodiments of the invention.

FIG. 5A illustrates a micrograph of the first sublayer of an anode electrode which comprises of 10% by volume porosity (visible as the black phase in the Figure), 5% by volume of nickel (shown as the grey particles in the Figure) and the rest Ce0.8Sm0.2O2.

Figure 5B:
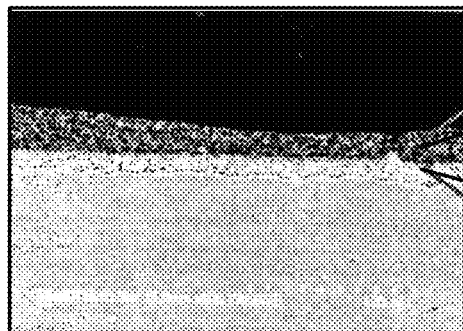
Figure 5C:
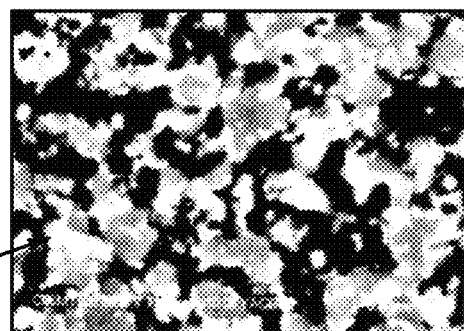
Figure 5D:
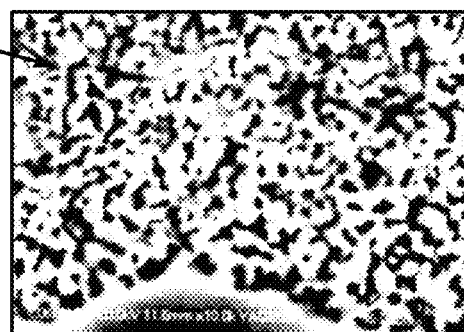

A performance of a ten cell SOFC stack was tested. In this stack, the even numbered cells comprised the anode electrode having the two sublayers. The first sublayer comprised 20 wt. % NiO and 80 wt. % (Ce0.8Sm0.2) oxide (i.e., SDC). The second sublayer comprised 70 wt. % NiO and 30 wt. % (Ce0.8Sm0.2) oxide. The NiO was subsequently reduced to nickel. The electrolyte comprised SSZ and the cathode electrode comprises LSM. The odd numbered cells used for comparative examples were identical to the even numbered cells, except that they contained a single layer anode electrode comprising Ni and SDC without any grading of the composition. FIG. 5B is a micrograph of a cross section an anode electrode of one of the even SOFCs in the ten cell stack. FIGS. 5C and 5D, respectively, are micrographs of the top and bottom sublayers, respectively, of the anode electrode of the SOFC shown in FIG. 5B. As can be seen from these Figures, the top sublayer has a higher porosity than the bottom sublayer adjacent to the electrolyte.

FIG. 6A is a plot of cell potential in volts versus time for the ten cell stack. The temperature line shows the operating temperature measured on the right axis. The stack was operated at a temperature of 850 C with a steam to carbon ratio of 2.2, fuel utilization of 25%, a 20 A current and 1.0 slm fuel flow. The fuel comprised natural gas reformed in an external reformer. The stack was subjected to two active redox (i.e., fuel starvation) cycles during which the fuel was turned off while drawing current from the stack (points marked "Active Redox" in FIG. 6A). The first cycle was performed between 117 and 122 hours of operation of the stack and the second redox cycle was performed between 260 and 265 hours of operation. During each redox cycle, the fuel flow was reduced by 0.125 slm every hour while keeping other parameters constant until the fuel flow reached 0. For the second cycle, an extra power supply was used to draw more current from the stack than in the first cycle. During the first redox cycle, the current decreased to zero as the fuel flow was reduced to zero. During the second redox cycle, the current decreased to 3A as the fuel flow was reduced to zero. FIG. 6B is a close up of region "B" in FIG. 6A which shows the cell potential after the second redox cycle. The dashed line in FIG. 6B shows the fuel utilization on the right axis. As shown in FIGS. 6A and 6B, the even numbered cells (V02, V04, V06, V08, V10) survived both redox cycles with minimal degradation and exhibited performance similar to their initial performance prior to the redox cycles (i.e., within 10% of the initial performance). However, some anode delamination was observed in the even numbered cells in area near the fuel inlet where the current densities are relatively high. Thus, the use of the graded nickel content profile in the fuel flow direction shown in FIG. 2 may reduce the delamination near the fuel inlet. In contrast, the odd numbered cells of the comparative examples (V03, V05 and V07) suffered significant damage during the redox cycles. The first cell (V01) of the comparative example was the closest cell to the fuel inlet and was not polarized negative during the redox cycles suggesting that this cell received some residual fuel from the piping during the redox cycles. Thus, this cell suffered some damage, but did not suffer as much damage as the other cells of the comparative example.

Figure 7A:
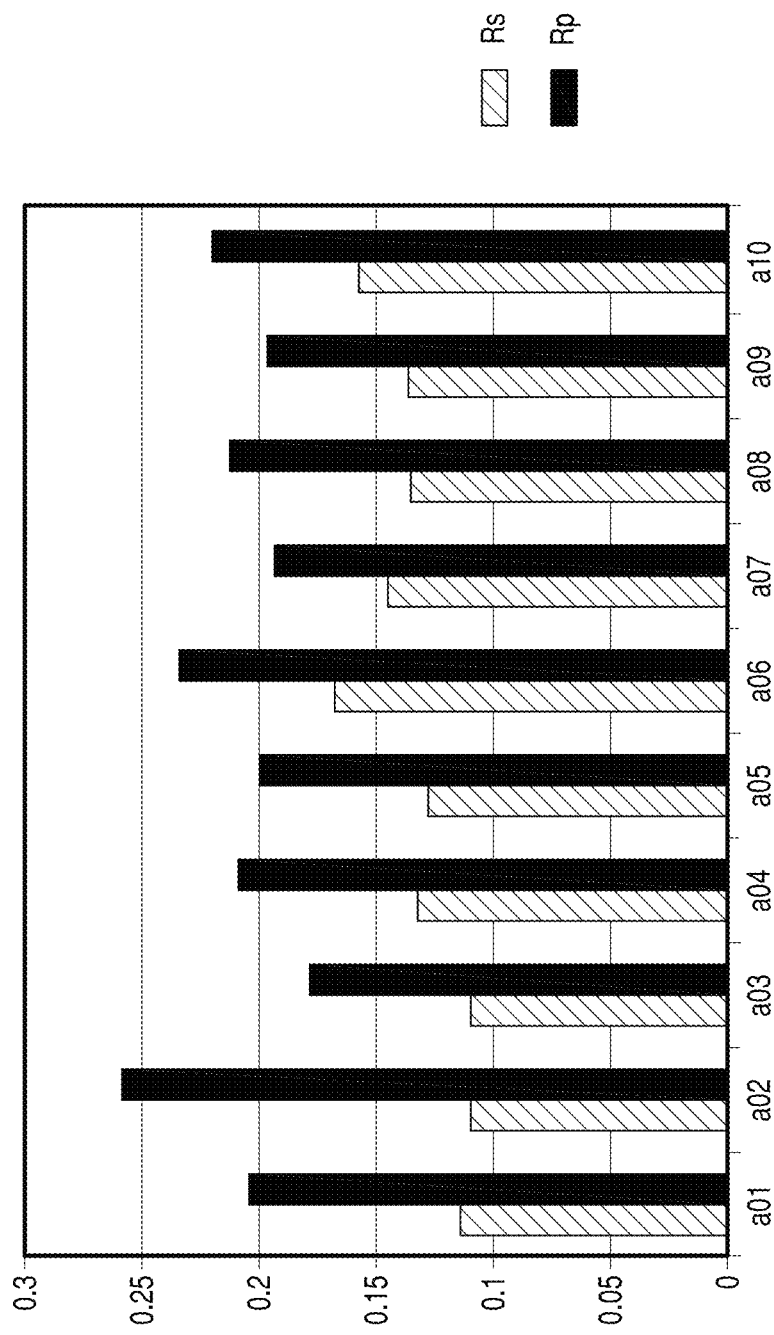

An AC impedance data testing was performed three time during the experiment, after 93, 162 and 311 hours of operation, at points marked "ACIS" in FIG. 6A (i.e., before the first redox cycle, between the redox cycles and after the second redox cycle, respectively). FIGS. 7A, 7B and 7C show a bar graph of ohmic resistance (Rs) and time dependent resistance (Rp) of the ten cells (marked 01 to 10, with cells 07 and 09 not being measured at 311 hours) at 93, 162 and 311 hours, respectively. The testing was done at 40 A and 75% fuel utilization at 93 hours, and at 10 A and 20% fuel utilization at 162 and 311 hours. The testing was done at a lower current at 162 and 311 hours due to the damage to the cells of the comparative examples.

The comparison of the values of the Rs and Rp values between 90 and 162 hours (i.e., before and after the first redox cycle) showed that the value of Rs degraded on the average by −23.9% for the odd numbered cells of the comparative examples, but on the average by only −3.2% for the even numbered cells of the examples of the embodiments of the invention. Furthermore, Rp degraded on the average by −22% for the odd numbered cells of the comparative examples, but improved on the average by 1% for the even numbered cells of the examples of the embodiments of the invention. The negative degradation implies that the cells of the embodiments of the invention are fuel starvation tolerant and perform better than the cells of the comparative examples. Thus, the cells with the graded anode electrode compositions of the embodiments of the present invention suffer a degradation in Rs and Rp resistance of less than 5%, such as less than 1% in Rp degradation after a redox (i.e., fuel starvation while drawing current) cycle.

The absence of irreversible damage to the anodes of the embodiments of the invention after having suffered conditions of excessively high fuel utilization (in excess of 100%) show the fuel starvation tolerance of these anode compositions. Since events of high fuel utilization will systematically occur within the lifetime of a fuel cell system, the use of these anodes will increase reliability and lifetime of SOFC stacks.

The anode electrodes of the embodiments of the invention show a marked improvement in their capability to operate under conditions of extreme starvation. Furthermore, after the starvation event, the performance of these electrode is hardly affected. These electrodes are similar in performance to standard solid oxide fuel cell electrodes allowing the construction of more reliable stacks that are forgiving to system anomalies which can be translated to an extended lifetime of the stack. Finally, the anodes electrode of the embodiments of the invention should be stable in both SOFC and SORFC modes (i.e., in reversible fuel cell and electrolysis modes) of operation.

Figure 8:
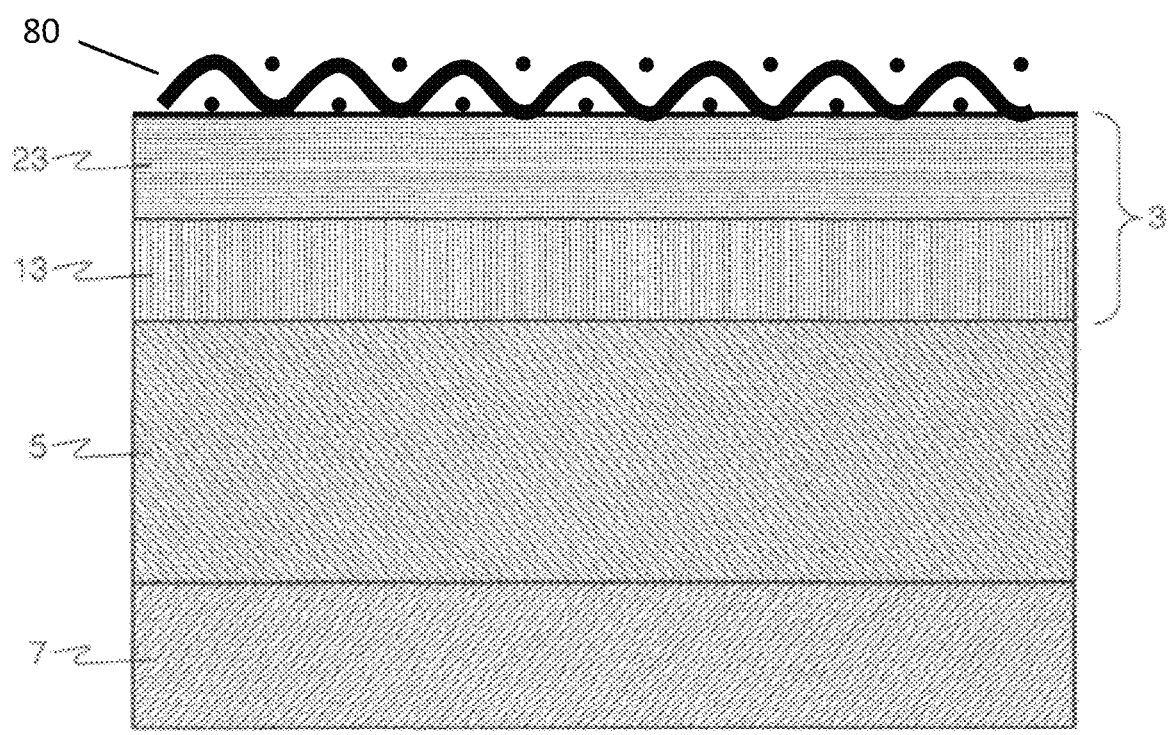
FIG. 8 is a schematic illustration of a SOFC cell according to another embodiment.

In an embodiment illustrated in FIG. 8, a metal mesh wire current collector 80 is affixed to the second portion 23 of the anode electrode 3. In an aspect of this embodiment, the metal comprises nickel. However other metals such as copper, cobalt, platinum, gold, palladium, silver or rhodium and alloys thereof may be used in addition to or instead of nickel.

As discussed above, when operating under conditions of extreme fuel starvation the oxygen ion flux to the anode will oxidize the anode constituents. When the fuel cell is returned to service under conditions of high fuel concentration, one or more of the oxides are reduced back to metal. Such multiple reduction-oxidation (redox) cycles can damage the anode electrode 3. For example cracks may form in the anode electrode 3. Additionally, multiple redox cycles may cause mesh knuckles of the metal mesh wire current collector 80 to wear away from the second portion 23 of the anode electrode 3, causing the current collector 80 to contact the lower conductivity first portion 13 of anode electrode 3. Further, multiple redox cycles may cause agglomeration of the metal into discrete islands in the anode electrode 3, resulting in a reduction in the connectivity/continuity of the metal and thereby increasing resistance in the anode electrode 3. Crack formation in the anode electrode 3, wearing away of the second portion 23 by the current collector 80 and/or agglomeration of the metal may occur in less than 10 redox cycles, for example 5-10 redox cycles.

The inventors have determined that the above problems may be reduced or overcome by increasing the thickness of the second portion 23 of the anode electrode 3 to at least 15 microns. In an embodiment, the second portion of the anode electrode has a thickness of 16-40 microns, such as a thickness of 16-20 microns.

In an experiment, stacks with alternating SOFC cells having anode electrodes 3 with second portion 23 thicknesses of 8-10 µm, 16-20 µm and 7-9 µm were subject to 20 redox cycles. The cells having a second portion 23 thickness of 16-20 µm showed better voltage performance than the thinner second portions 23. Cells with thinner second portions 23 showed a significant drop in performance after the $12^{th}$ cycle. On the other hand, the cells with second portion 23 of greater than 15 microns showed almost no loss in performance after 20 cycles.

It was observed that with the thicker second portions 23, the metal mesh wire current collector 80 does not wear away the entire thickness of the second portion 23 during the redox cycle. Thus, the current collector 80 is able to contact the lower resistivity second portion 23 of the anode electrode 3 rather than the high resistivity first portion 13 of the anode electrode 3. Further the thicker portions 23 provide a lower resistivity due to the increase thickness (e.g. increasing the thickness improves in plane conductivity of the second portion 23 of the anode electrode 3).

In an embodiment, the anode comprises a multilayer or graded cermet, where the metallic or electrically conducting phase contains nickel, copper, cobalt, platinum or platinum-group metals (such as gold, palladium, silver, rhodium), or some alloy thereof, and the ionically conducting phase contains doped ceria (such as samaria-doped ceria, or gadolinia doped ceria) or doped zirconia (such as yttria doped zirconia, scandia doped zirconia, scandia-ceria doped zirconia). Another embodiment comprises an anode with two or more cermet layers distinguished by their porosity, thickness, and/or the ratio of the ceramic to metal phases. Another embodiment comprises a single layer with porosity, ratio of ceramic to metal phase, or composition that vary through the thickness of the layer.

In an embodiment, the first portion 13 of the anode electrode 3 may contain between 5 and 50 weight percent nickel containing phase, such as between 20 and 30 weight percent nickel containing phase. The second portion 23 of the anode electrode 3 may contain between 60 and 90 weight percent nickel containing phase, such as between 70 and 80 weight percent nickel containing phase.

In an embodiment, the first portion 13 of the anode electrode 3 may have a porosity of 10-20% after sintering, such as about 15% after sintering. The second portion 23 of the anode electrode 3 may have a porosity of 20-40%, such as about 30%.

In an embodiment, the second portion 23 of the anode electrode 3 has a porosity of 30-40% in the sintered and reduced state and a thickness of 20-40 μm, such as about 30 μm. In another embodiment, the second portion 23 of the anode electrode 3 has a porosity of 20-35% in the sintered and reduced state and a thickness of 15-30 μm, such as about 20 μm. If the thickness of the second portion 23 is greater than 40 microns, then polarization losses may negatively affect the conductivity of the anode electrode 3.

An embodiment is drawn to a solid oxide fuel cell (SOFC) comprising a cathode electrode 7, a solid oxide electrolyte 5 and an anode electrode 3 comprising a first portion 13 comprising a cermet containing a nonzero volume percent of a metal phase, such as a nickel containing phase, and a nonzero volume percent of a ceramic phase and a second portion 23 comprising a cermet containing a nonzero volume percent of a metal phase, such as a nickel containing phase, and a nonzero volume percent of a ceramic phase, such that the first portion 13 is located between the electrolyte 5 and the second portion 23. The SOFC is an electrolyte-supported SOFC and the first portion 13 of the anode electrode 3 contains a lower ratio of the metal phase, such as a nickel containing phase, to the ceramic phase than the second portion 23 of the anode electrode 3. The first portion 13 of the anode electrode 3 has a porosity of 5-30 volume percent and the second portion 23 of the anode electrode 3 has a porosity of 31-60 volume percent. In an embodiment, the metal phase comprises at least one of nickel, copper, cobalt, platinum, gold, palladium, silver or rhodium.

In an embodiment, the first portion 13 of the anode electrode 3 has a nickel phase content of 1-20 volume percent and the second portion 23 of the anode electrode has a nickel phase content of 21-60 volume percent. In an embodiment, the SOFC further comprises a nickel mesh wire current collector affixed to the second portion of the anode electrode. In an embodiment, the SOFC further comprises an electrolyte comprising scandia stabilized zirconia (SSZ) or yttria stabilized zirconia (YSZ) in contact with the first portion of the anode electrode.

In an embodiment, the second portion of the anode electrode has a thickness of 16-40 microns. In an embodiment, the second portion of the anode electrode has a thickness of 16-20 microns. In an embodiment, the ceramic phase in the first portion comprises a ceramic phase comprising doped ceria and the ceramic phase in the second portion comprises a ceramic phase comprising doped ceria. In an embodiment, the ceramic phase in the first portion comprises samaria-doped ceria or gadolinia doped ceria and the ceramic phase in the second portion comprises samaria-doped ceria or gadolinia doped ceria.

In an embodiment, the first portion contains between 5 and 50 weight percent of the nickel containing phase and between 50 and 95 weight percent of the doped ceria containing phase and the second portion contains between 60 and 90 weight percent of the nickel containing phase and between 10 and 40 weight percent of the doped ceria containing phase. In an embodiment, the first portion contains between 20 and 30 weight percent of the nickel containing phase and between 70 and 80 weight percent of the doped ceria containing phase and the second portion contains between 70 and 80 weight percent of the nickel containing phase and between 20 and 30 weight percent of the doped ceria containing phase.

The foregoing description of the invention has been presented for purposes of illustration and description. It is not intended to be exhaustive or to limit the invention to the precise form disclosed, and modifications and variations are possible in light of the above teachings or may be acquired from practice of the invention. The description was chosen in order to explain the principles of the invention and its practical application. It is intended that the scope of the invention be defined by the claims appended hereto, and their equivalents.

The invention claimed is:

1. A solid oxide fuel cell (SOFC), comprising:
a cathode electrode;
a solid oxide electrolyte; and
an anode electrode comprising a first portion comprising a cermet containing a nonzero volume percent of a nickel containing phase and a nonzero volume percent of a ceramic phase and a second portion comprising a cermet containing a nonzero volume percent of a nickel containing phase and a nonzero volume percent of a ceramic phase, such that the first portion is located between the electrolyte and the second portion; wherein:
the SOFC is an electrolyte-supported SOFC and the first portion of the anode electrode contains a lower ratio of the nickel containing phase to the ceramic phase than the second portion of the anode electrode;
the first portion of the anode electrode has a porosity of 5-30 volume percent; and
the second portion of the anode electrode has a porosity of 31-60 volume percent,
wherein the second portion of the anode electrode has a thickness of 16-40 microns;
wherein the ceramic phase in the first portion comprises a ceramic phase comprising doped ceria and the ceramic phase in the second portion comprises a ceramic phase comprising doped ceria;
wherein the ceramic phase in the first portion comprises samaria-doped ceria or gadolinia doped ceria and the ceramic phase in the second portion comprises samaria-doped ceria or gadolinia doped ceria;
the first portion contains between 5 and 50 weight percent of the nickel containing phase and between 50 and 95 weight percent of the doped ceria containing phase; and
the second portion contains between 60 and 90 weight percent of the nickel containing phase and between 10 and 40 weight percent of the doped ceria containing phase.

2. The SOFC of claim 1, wherein the first portion of the anode electrode has a nickel phase content of 1-20 volume percent and the second portion of the anode electrode has a nickel phase content of 21-60 volume percent.

3. The SOFC of claim 1, further comprising a nickel mesh wire current collector affixed to the second portion of the anode electrode.

4. The SOFC of claim 1, wherein the second portion of the anode electrode has a thickness of 30 microns.

5. The SOFC of claim 1, wherein the second portion of the anode electrode has a thickness of 16-20 microns.

6. The SOFC of claim 1, wherein:
the first portion contains between 20 and 30 weight percent of the nickel containing phase and between 70 and 80 weight percent of the doped ceria containing phase; and
the second portion contains between 70 and 80 weight percent of the nickel containing phase and between 20 and 30 weight percent of the doped ceria containing phase.

* * * * *